United States Patent [19]

Mölders

[11] 4,373,707

[45] Feb. 15, 1983

[54] CONSTRUCTION INCLUDING A GAS SPRING

[75] Inventor: Werner Mölders, Plaidt, Fed. Rep. of Germany

[73] Assignee: Stabilus GmbH, Koblenz-Neuendorf, Fed. Rep. of Germany

[21] Appl. No.: 208,296

[22] Filed: Nov. 19, 1980

[30] Foreign Application Priority Data

Nov. 29, 1979 [DE] Fed. Rep. of Germany ....... 2948081

[51] Int. Cl.$^3$ .................. A47C 20/04; F16F 9/00; F16F 9/54
[52] U.S. Cl. ...................... 267/64.12; 267/64.25; 267/120; 267/124
[58] Field of Search ............. 267/64.25, 64.15, 64.16, 267/64.17, 64.18–64.24, 64.26, 64.27, 120, 64.12, 124–129, 121, 117, 131; 188/300, 269, 312–314, 316, 319, 321.11, 268, 322.11–322.22; 248/354 H, 404; 16/84

[56] References Cited

U.S. PATENT DOCUMENTS

| | | | |
|---|---|---|---|
| 2,539,841 | 1/1951 | Katz | 267/64.15 |
| 2,559,967 | 7/1951 | Katz | 267/64.15 |
| 3,128,088 | 4/1964 | Paschakarnis | 267/64.15 X |
| 3,711,054 | 1/1973 | Bauer | 248/400 |
| 3,762,514 | 10/1973 | Freitag | 188/300 |
| 3,825,244 | 7/1974 | Bauer | 267/64.12 X |
| 3,938,793 | 2/1976 | Kaptanis et al. | 267/120 |
| 4,072,288 | 2/1978 | Wirges et al. | 248/404 |
| 4,156,523 | 5/1979 | Bauer | 267/120 |
| 4,245,826 | 1/1981 | Wirges | 267/131 |

FOREIGN PATENT DOCUMENTS

| | | | |
|---|---|---|---|
| 2547664 | 4/1977 | Fed. Rep. of Germany . | |
| 1526856 | 10/1978 | United Kingdom . | |
| 1527013 | 10/1978 | United Kingdom . | |
| 1566167 | 4/1980 | United Kingdom . | |
| 2064714 | 6/1981 | United Kingdom | 267/64.12 |

Primary Examiner—Douglas C. Butler
Attorney, Agent, or Firm—Brumbaugh, Graves, Donohue & Raymond

[57] ABSTRACT

In the illustrative embodiments of the invention described, a main gas spring unit used to raise and lower a movable leg rest member of a bed construction includes a further gas spring device axially connected end-to-end to the main gas spring unit. The addition of the gas spring device allows the leg rest member to be raised, with only a small manual effort, to a higher level than is possible with the main gas spring unit alone. Preferably the internal force exerted on the piston rod of the main gas spring unit is greater than the internal force exerted on the piston rod of the gas spring device. The cylinder members of the main gas spring unit and the gas spring device may be formed by a common tubular member, with the two units being separated by a common movable wall. Alternatively, the cylinder members can be separate self-contained members that are rigidly attached at adjoining end walls thereof.

10 Claims, 7 Drawing Figures

10

CONSTRUCTION INCLUDING A GAS SPRING

BACKGROUND

1. Field of the Invention

The present invention relates to a novel arrangement of a gas spring unit for facilitating the movement and positioning of adjustable components in a construction assembly.

2. The Prior Art

Known constructions or assemblies of the type referred to include, for example, bed assemblies including a stationary basic construction unit, e.g. the frame of the bed, and a movable construction unit, e.g. a height-adjustable leg rest member. It is also known in such bed assemblies to carry out height adjustment of the leg rest member by variation of a gas spring unit connected between the stationary and movable construction units.

SUMMARY

It is an object of this invention to modify known constructions of the foregoing type in such a way that the movable construction unit can be moved over a path of movement which is greater than the path of movement afforded by the gas spring unit, this additional movement of the movable construction unit being promoted by, but not necessarily entirely effected by, gas spring action.

The foregoing and other objects are attained, in accordance with the invention, by combining with the gas spring unit a second gas spring device, including a cylinder element, a piston rod element sealingly guided through one end of the cylinder element, and a pressurized fluid in the cylinder element.

Either the cylinder element or the piston rod element is fixedly connected end-to-end with a respective member (cylinder or piston rod) of the gas spring unit, the other of piston rod or cylinder elements being connected to the adjacent construction unit. Preferably the force exerted on the piston rod element by the pressurized fluid in the cylinder element is smaller than the force exerted by the main gas spring unit on the construction units at least in the innermost position of the piston rod element within the cavity of the cylinder element.

In one embodiment of the invention, the cylinder members of the main gas spring unit and the gas spring device are formed by a common tubular member, with the cavities of the two units being separated by a common movable wall. In this instance, the fluid within the main gas spring unit suitably may be a liquid and the fluid within the gas spring device may be a pressurized gas, the pressure of which acts via the movable wall onto the liquid with the gas spring unit.

According to other embodiments of the invention, the cylinders of the two units can be separate, self-contained members that are rigidly attached at adjoining end walls thereof. The fluid within the main gas spring unit may again be a liquid, but in this case an expansion chamber, filled with a pressurized gas, is also provided within the main gas spring unit and separated from the piston by a movable wall. The fluid within the gas spring device is, again, preferably a pressurized gas.

When used in bed constructions of the kind referred to above, the presence of the gas spring device in combination with the main gas spring unit in accordance with the invention permits the leg rest member to be lifted with only small manual force beyond the uppermost position afforded by the main gas spring unit itself. This additional lifting of the leg rest member may be desired, for example, for better access to a compartment containing bedclothes or the like located under the leg rest member.

BRIEF DESCRIPTION OF THE DRAWINGS

The invention will now be further described with reference to the illustrative embodiments thereof shown in the accompanying drawings, in which.

DETAILED DESCRIPTION

Figure 1:
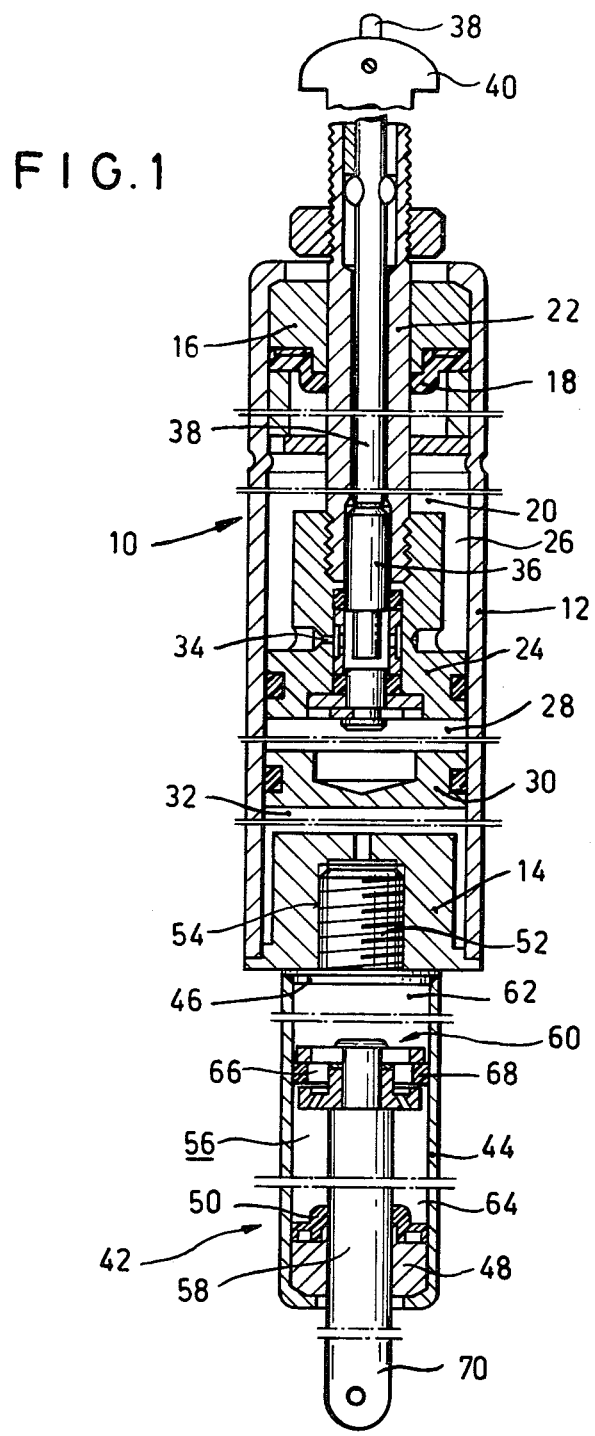
FIG. 1 is a longitudinal sectional view of a first embodiment of a gas spring unit constructed in accordance with the invention.

In the embodiment of FIG. 1, the gas spring unit, designated by number 10, includes a cylinder member 12 which is closed at one end by a plug 14 and at the other end by a guiding member 16 and a sealing member 18, the guiding member 16 and said sealing member 18 being provided with central apertures. A cavity 20 is defined within the cylinder member 12, and a piston rod member 22 is introduced into the cavity 20 through the apertures in the guiding member 16 and the sealing member 18. A piston 24 is threaded or otherwise suitably attached to the inner end of the piston rod member 22 and separates the cavity 20 into two working chambers 26 and 28. The working chambers 26 and 28 are filled with a hydraulic medium such as a hydraulic oil. The working chamber 28 is defined at its lower (as seen in FIG. 1) end by a movable separating wall 30 which sealingly engages the inner wall of the cylinder member 12 and defines with the end wall 14 a gas chamber 32 which contains a pressurized gas, such as nitrogen. The gas pressure of the gas contained in the gas chamber 32 is transmitted by the separating wall 30 to the liquid contained in the working chambers 26 and 28.

The working chambers 26 and 28 are connected by a throttled liquid passage 34 extending through the piston 24. This passage can be opened and closed by a valve unit 36 accommodated within the piston 24. FIG. 1 depicts the valve unit 36 in a position to close the liquid passage 34. The piston rod member 22 is provided with an axial bore and this axial bore accommodates an operating rod 38. If the operating rod 38 is moved downwards from the position shown in FIG. 1, the valve unit 36 is shifted into a position in which the liquid passage 34 interconnects the working chambers 26 and 28. However, as long as no external inward pressure is exerted on the operating rod 38, the valve unit 36 is held in closed position by the internal pressure of the liquid in the working chamber 28. A connecting member 40 is provided at the upper end of the piston rod member 22 for connection of the member to a supporting structure, as hereinafter described.

In accordance with the invention, a gas spring device 42 is rigidly connected to the gas spring unit 10, as by the threaded boss 52 received within the threaded bore 54 in the plug member 14. The gas spring device includes a cylinder element 44 which is closed at one end by a closure plate 46 and at the other end by an annular guiding member 48 and a sealing member 50. The threaded boss 52 is suitably welded or otherwise secured to the plate 46. A piston rod element 58 is introduced into the cavity 56 of the cylinder element 44 through the central apertures of the guiding member 48 and the sealing member 50 and carries at its inner end a piston unit 60. The piston 60 divides the cavity 56 into two working compartments 62 and 64 which are filled with a gas under pressure. The piston 60 is provided with a passage 66 across the piston, and a piston ring 68 is axially movable with respect to the piston 60 in the well known way to change the flow cross-section of the passage 66 in response to the direction of movement of the piston rod element 58 relative to the cylinder element 44. Thus, as will be understood, movement of the piston rod element 58 inward of the cavity 56, i.e. upward as seen in FIG. 1, is subject to a stronger damping action than is outward movement of the piston rod element 58 from the cavity 56. A second connecting member 70 of any suitable configuration is fixed to the lower end of the piston rod element 58.

Figure 2:
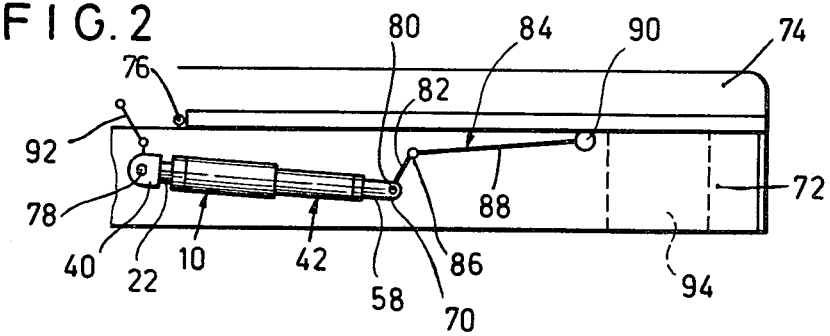
FIGS. 2, 3 and 4 are schematic views of a bed construction including a gas spring unit according to FIG. 1, showing the leg rest member of the bed being in different positions of height adjustment.

In FIG. 2, there is shown a portion of the frame 72 of a bed assembly or construction, such as a hospital bed. A leg rest member 74 is pivotally mounted to the frame 72 about a pivot axis 76. In accordance with the invention, the gas spring unit 10 of FIG. 1 is connected to the frame 72 by the connecting member 40 for pivotal movement about a pivot axis 78 and is connected to an arm 82 of a two-armed lever 84 by the connecting member 70 for pivotal movement about a pivot axis 80. The two-armed lever 84 is pivotally connected to the frame 72 about a central pivot axis 86, and the other arm 88 thereof is pivotally connected to the leg rest member 74 about a pivot axis 90.

An operating lever 92 is diagrammatically shown in FIG. 2. This operating lever acts on the operating rod 38 of FIG. 1 so as to open the passage 34 by axially moving the valve unit 36, and may be mounted so as to act against the outer end of the rod 38 in any appropriate manner.

In the position shown in FIG. 2, the piston rod member 22 is in its innermost position with respect to the cylinder member 12. With the passage 34 closed, the piston 24 and the piston rod member 22 will therefore be substantially locked with respect to the cylinder member 12 to hold the leg rest member 74 in the lowered position of FIG. 2.

Further, in the position of FIG. 2 the piston rod element 58 is in its innermost position with respect to the cylinder element 44. The gas pressure in the cavity 64 acting on the cross-sectional area of the piston rod element 58 exerts a force on the piston rod element 58, which force tends to rock the two-armed lever 84 about the pivot axis 86. Preferably, however, this force is not strong enough to overcome the torque exerted on arm 88 of the lever 84 by the weight of the leg rest member 74. Consequently, the leg rest member will remain in the position shown in FIG. 2.

Figure 3:
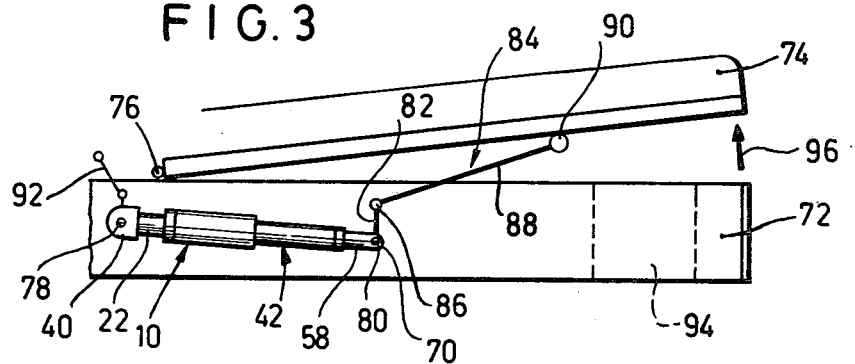

If the passage 34 in the spring unit of FIG. 1 is then opened by manual operation of the operating lever 92, the piston rod member 22 will be pushed in the outward direction with respect to the cavity 26 (by the pressure exerted by the gas in chamber 32) so that the two-armed lever 84 will be rocked in the counter-clockwise direction (as shown in FIG. 3) until the passage 34 is again closed or until the member 22 reaches the outermost position to which it can move. It is assumed in the position of the construction shown in FIG. 3 that the piston rod member 22 is in its outermost position with respect to the cavity 26. This means that the leg rest member 74 is in the uppermost position that can be achieved due to the action of the gas spring unit 10. In the position shown in FIG. 3, however, the piston rod element 58 is still in the innermost position with respect to the cavity 56, because, as previously stated, the force exerted on the piston rod element 58 by the gas pressure in the cavity 56 is preferably insufficient to overcome the torque (clockwise as seen in FIG. 3) exerted on the two-armed lever by the weight of the leg rest member 74.

It may be assumed that the leg rest member 74 in the position shown in FIG. 3 is in the highest position which is desired for purposes of correct positioning of the user's legs. However, it is desirable in certain situations, such as where a compartment 94 is provided within the frame 72 to accommodate bedclothes and the like for instance, to provide for additional elevation of the leg rest member 74. This permits better access to the compartment 94. Such additional raising of the leg rest member 74 is achieved, in accordance with the invention, by manually lifting the leg rest member 74 in the direction of arrow 96 in FIG. 3. The force necessary for lifting the leg rest member 74 from the position of FIG. 3 to the position of FIG. 4, however, is relatively small, because the lifting action is promoted by the force exerted by the gas in the cavity 56 on the piston rod element 58, which force is transmitted to the arm 82 of the two-armed lever 84.

Figure 4:
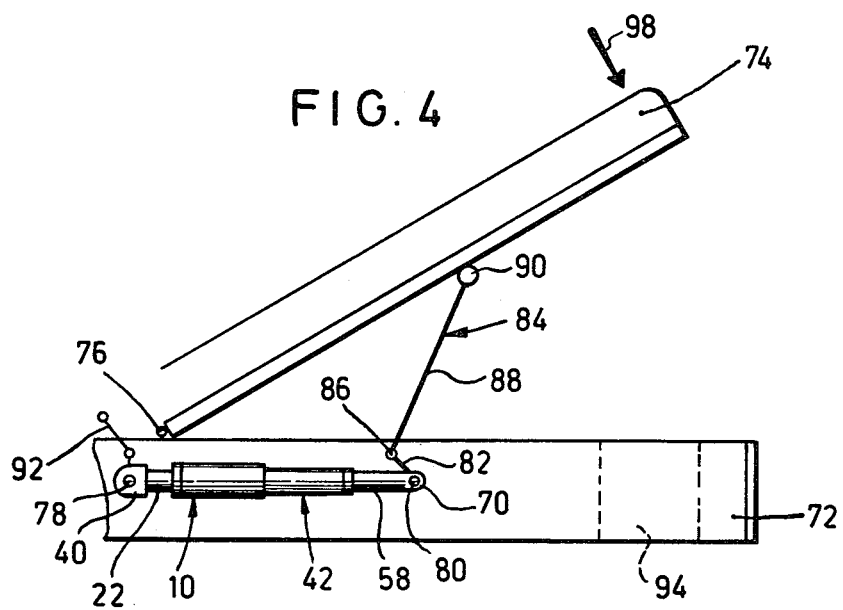

In the position shown in FIG. 4, the torque exerted by the weight of the leg rest member 74 on the two-armed lever 84 is reduced as compared to the torque exerted in the position of FIG. 3. In the position of FIG. 4, therefore, the outward force acting on the piston rod element 58 due to the pressure in the cavity 56 is sufficient to overcome the torque exerted by the weight of the leg rest member 74 on the two-armed lever 84. This means that when the position of FIG. 4 has once been achieved, the leg rest member 74 will remain in this position until a closing force sufficient to overcome the outward force due to the pressure in cavity 56 is exerted on the leg rest member 74 by hand in the direction of arrow 98 in FIG. 4. Continued downward pressure on the leg rest member 74 will return the construction to the configuration of FIG. 3. Operation of the lever 92 to reopen the fluid passage 34 across the piston 24 of spring unit 10 then permits the construction to be returned to the configuration of FIG. 1.

Figure 5:
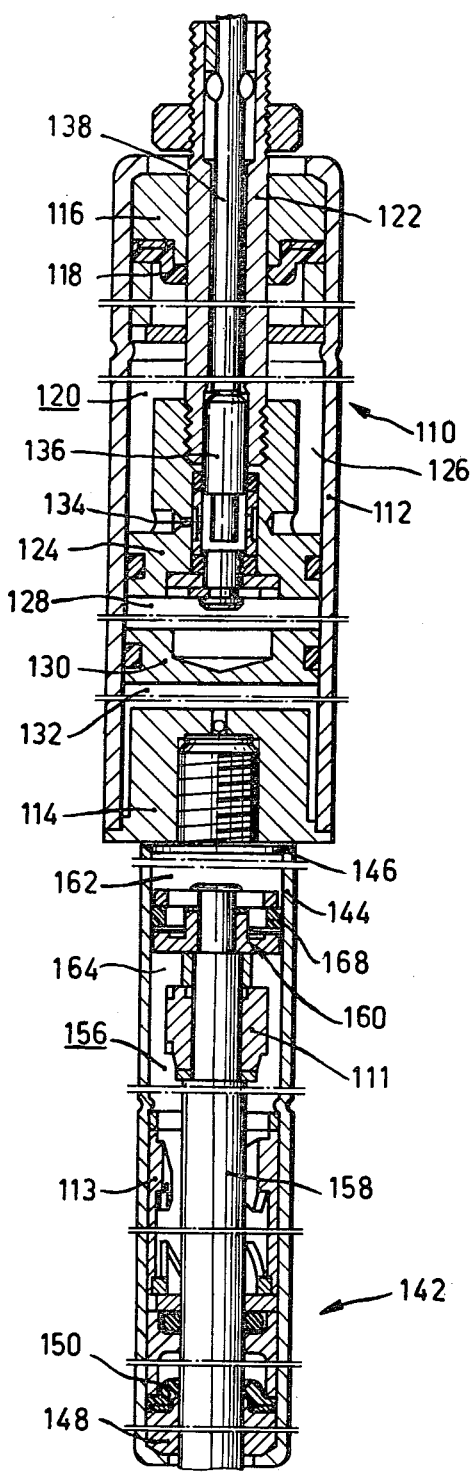
FIG. 5 is a longitudinal sectional view of a second embodiment of a gas spring unit.

In FIG. 5, there is shown a further embodiment of the gas spring unit. Analogous parts are designated by the same reference numbers as in FIG. 1, increased by 100. The upper part 110 has remained unchanged from the embodiment of FIG. 1, with the lower gas spring device having been modified to include mechanical locking structure for locking the piston rod element 158 in its outermost position with respect to the cylinder element 144. In this connection, a drum member 111 provided with cam shaped projections on its peripheral face is mounted on the piston rod element 158 so as to be rotatable relative thereto. A cam sleeve 113 is mounted on the inner side of the cylinder element 144 adjacent the lower end thereof. This cam sleeve 113 is provided with inwardly directed cams. The details of the cam shaped projections on the drum 111 and of the cams on sleeve 113 are disclosed in U.S. Pat. No. 3,938,793, the pertinent portions of which are hereby incorporated into this specification by reference. In accordance with the cam structure of the '793 patent, when the drum member 111 approaches a position adjacent the cam sleeve 113, the piston rod element 158 is locked against inward movement with respect to the cavity 156 by interengagement of the cams on the drum member 111 and the cams on sleeve 113. The piston rod element 158 can be unlocked again, in the manner disclosed in the '793 patent, by moving the piston rod element 158 for a short distance in outward direction with respect to the cylinder element 144. When the embodiment of FIG. 5 is used in a bed construction as shown in FIG. 2, the leg rest member 74 is preferably secured in the uppermost position of FIG. 4 by the mechanical locking structure just described. In order to unlock the leg rest member, it is then only necessary to lift it for a short distance beyond the position shown in FIG. 4.

Figure 6:
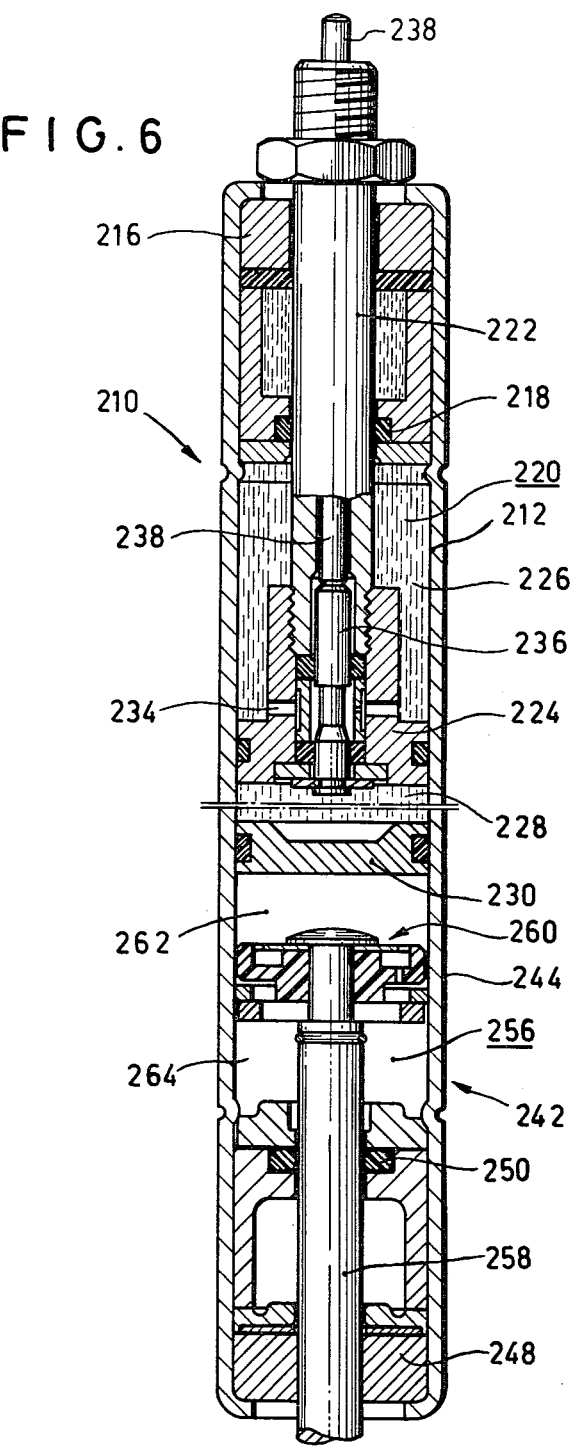
FIG. 6 is a longitudinal sectional view of still another embodiment of a gas spring unit according to the invention.

FIG. 6 shows a third embodiment, analogous parts being designated by the same reference numbers as in FIG. 1 increased by 200. In the embodiment of FIG. 6, the upper cylinder member 212 and the lower cylinder element 244 are formed by an integral tubular member, and the movable separating wall 230 separates the working chamber 228 of the gas spring unit 210 from the cavity 256 of the gas spring device 242. As will be appreciated, the pressurized gas contained within the cavity 256 exerts a pressure on the liquid contained in the working chambers 226 and 228. The embodiment of FIG. 6 is intended to be mounted in the bed construction of FIG. 2 in the same way as the embodiment of FIG. 1, and it functions therein in the same way. It is to be noted, however, that it is necessary to make the cross-sectional area of the piston rod element 258 smaller than the cross-sectional area of the piston rod member 222. This necessity results from the pressure in cavity 256 being identical to the pressure in the working chamber 228. Due to the difference in cross-sectional area between the piston rod element 258 and the piston rod member 222, the outward force exerted on the piston rod member 222—when the passage 234 is opened—by the pressure in the cavity 220 will be greater than the force exerted on the piston rod element 258 by the pressure in cavity 256. This will enable the gas spring unit to move the leg rest member from the position of FIG. 2 to the position of FIG. 3 while still leaving the piston rod element 258 in the retracted position.

Figure 7:
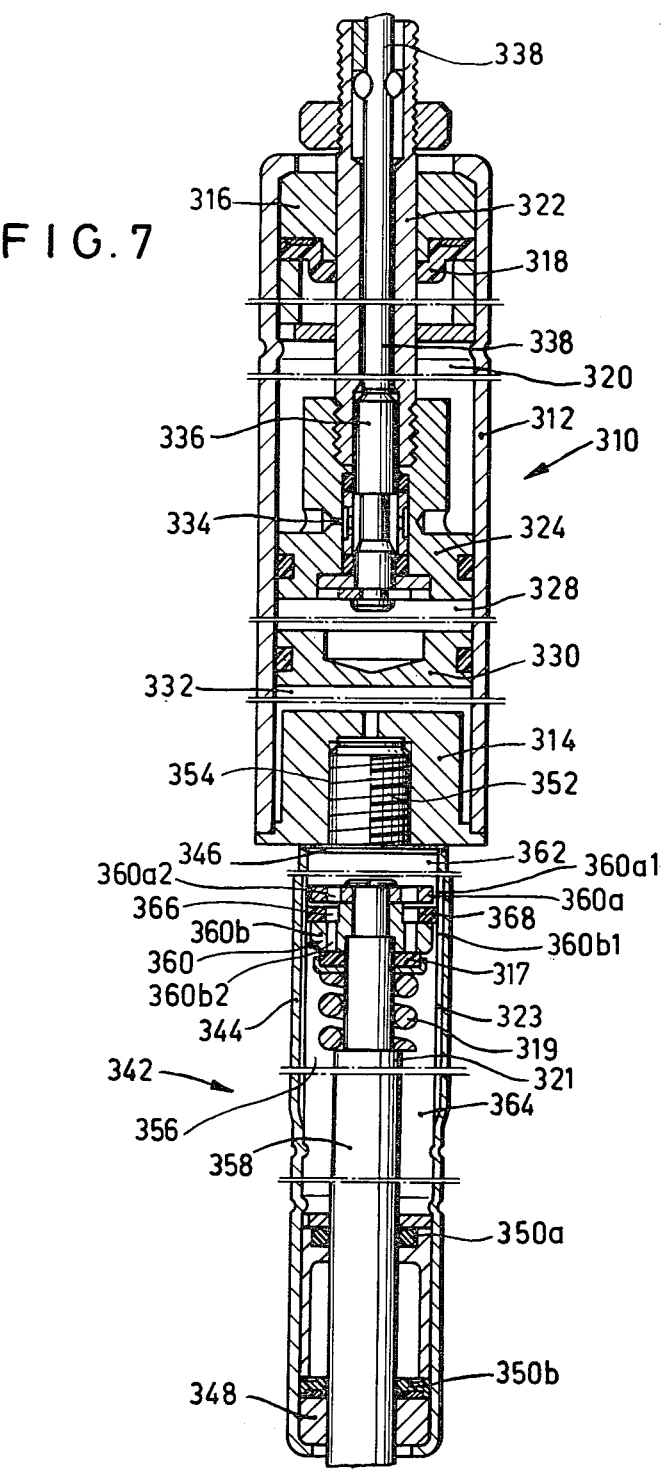
FIG. 7 is a longitudinal sectional view of a fourth embodiment of a gas spring unit according to the invention.

In the embodiment of FIG. 7 analogous parts are designated by the same reference numbers as in FIG. 1 increased by 300. As there shown, the unit 310 is substantially identical to the unit 10 of FIG. 1, and the device of FIG. 7 differs from that of FIG. 1 primarily in that the lower spring unit 342 is provided with pneumatic locking structure to hold the piston rod element 358 in the desired position. In FIG. 7, the piston 360 comprises two disks 360a and 360b, with the piston ring 368 being arranged so as to be axially movable therebetween. The two piston disks 360a and 360b define annular gaps 360a1 and 360b1, respectively, with the inner face of the cylinder element 344. The piston disk 360a is provided with axial bores 360a2, and the piston disk 360b is provided with axial bores 360b2. The axial bores 360b2 are closable by a valve member 317 which is resiliently urged against the piston disk 360b by a helical compression spring 319 supported by a shoulder 321 on the piston rod element 358. The cylinder element 344 is formed with axial grooves 323 along the upper part of its length as seen in FIG. 7. The grooves 323 terminate above the lower section of the cylinder element 344 in which the piston 360 is situated when the piston rod element 358 is in its outermost position with respect to the cylinder 344.

When the piston rod element 358 moves outward from the position shown in FIG. 7, the piston ring 368 contacts the upper piston disk 360a and the gas contained in the compartment 364 can flow into the compartment 362 through both the gap 360b1 and the axial bores 360a2. This flow-path is open also when the piston 360 moves beyond the lower end of the grooves 323. Hence the piston 360 can move relatively freely to its outermost position with respect to the cylinder element 344. This corresponds to the movement of the bed construction from the configuration of FIG. 3 to the configuration of FIG. 4 by manual force 96. When the manual force 96 is removed, the leg rest member 74 will be locked in the position of FIG. 4 even if the gas pressure in the cavity 356 acting on the piston rod element 358 is not sufficient to overcome the torque exerted by the weight of the leg rest member 74 on the two-armed lever 84. This locking action is achieved as follows: When the piston rod element 358 is urged upward from its lowermost position towards the position shown in FIG. 7, the piston ring 368 first sealingly engages the cylinder element 344 in the axial section below the lower end of the grooves 323. On upward movement of the piston 360, the piston ring 368 therefore comes in contact with the upper face of the piston disk 360b, thereby closing the annular gap 360b1. Consequently, no flow of gas can occur from the compartment 362 to the compartment 364. Only when an outer force is applied to the leg rest member 74 by hand in the direction 98 of FIG. 4 sufficient to increase the pressure in the working compartment 362 to a value that the valve member 317 is lifted from the piston disk 360b, thereby opening the bores 360b2, can the gas contained in the working compartment 362 escape through the axial bores 360a2 and 360b2 into the working compartment 364. As soon as the piston ring 368 moves upward beyond the lower end of the grooves 323, the gas from the working compartment 362 can escape into the working compartment 364 through the groove 323, so that the leg rest member 74 can sink downwards under the action of the weight of the leg rest member 74 without the further exertion of manual force on the leg rest member 74. A more detailed description of a gas spring device having the behavior of the gas spring device 342 of FIG. 7 is to be found in U.S. Pat. No. 4,156,523.

With reference to FIGS. 2, 3 and 4 it is to be noted that the leg rest member 74 can also be lifted, starting from the position of FIG. 2, without opening the liquid passage 34 of the gas spring unit 10, i.e. without previous extension of the gas spring unit 10. Obviously in this case the terminal height of the leg rest member is lower than shown in FIG. 4. The same is true for the embodiments of FIGS. 5, 6 and 7.

The pressure in the cavity 20 of FIG. 1 is preferebly such that when the leg rest member 74 is not loaded, it can be lifted by the action of the gas spring unit 10 alone upon the opening of liquid passage 34, i.e., without manual lifting of the member 74. Accordingly, to return the leg rest member 74 from the position of FIG. 3 to the position of FIG. 2, it would be necessary to exert a manual, downward directed force on the leg rest member 74 simultaneously with opening the liquid passage 34. This also applies as well to the embodiments of FIGS. 5, 6 and 7.

Although the invention has been described with reference to specific embodiments thereof, many modifications and variations of such embodiments may be made by those skilled in the art without departing from the inventive concepts disclosed. For example, it will be understood that the invention is not restricted to bed assemblies or the like and that the invention has general utility in many applications in which, after a continuous adjustment provided by the gas spring unit, a further manual adjustment with the aid of the gas spring device is desired. All such modifications and variations, therefore, are intended to be included within the spirit and scope of the appended claims.

I claim:

1. In a construction, including:
   a stationary construction unit;
   a movable construction unit movably mounted on said stationary construction unit;
   a gas spring unit operatively connected to both said stationary construction unit and said movable construction unit, said gas spring unit including a cylinder member having two ends and a cavity defined therein, a piston rod member sealingly guided through an aperture in one of said ends, a piston connected to said piston rod member and defining two working chambers within said cavity, a pressurized fluid in said two working chambers, fluid passage means between said two working chambers, and valve means for opening and closing said fluid passage means;
   first connecting means for connecting one of said members to one of said construction units;
   second connecting means for connecting the other of said members to the other of said construction units;
   the improvement comprising:
   a gas spring device connected to the other of said members and to said second connecting means, said gas spring device including a cylinder element having two ends and a cavity defined therein, a piston rod element sealingly guided through an aperture in one end of said cylinder element, and a pressurized fluid in said cavity;
   one of said cylinder and piston rod elements being connected to said other member of said gas spring unit, the other of said cylinder and piston rod elements being connected to the said second connecting means;
   said piston rod member being movable along a path of movement with respect to said cylinder member between an innermost position and an outermost position, said pressurized fluid within said cylinder member exerting an expelling force onto said piston rod member towards said outermost position when said valve means are open, said piston rod member being lockable in a plurality of positions along said path of movement by closing said valve means;
   said piston rod element being movable along a range of movement with respect to said cylinder element between an innermost position and an outermost position, said pressurized fluid within said cylinder element exerting an expelling force onto said piston rod element towards said outermost position;
   said movable construction unit being lockable in a plurality of positions corresponding to said plurality of positions of said piston rod member with said piston rod element being in its innermost position;
   said movable construction unit being further movable along an additional way of movement adjacent its respective locked position, said additional way of movement corresponding to said range of movement of said piston rod element;
   said movable construction unit exerting a movement-resisting force on both said piston rod member and said piston rod element counteracting to said expelling forces exerted on said piston rod member and said piston rod element by pressurized fluid;
   said expelling force exerted on said piston rod member exceeding said movement-resisting force along the path of movement of said piston rod member; and
   said expelling force exerted on said piston rod element by pressurized fluid being smaller than said movement-resisting force at least when said piston rod element is in its innermost position.

2. The construction of claim 1, wherein said one element connected to said one member is said cylinder element, said cylinder element being connected at the end thereof remote from said apertured end thereof to that end of said cylinder member which is remote from said apertured end thereof.

3. The construction of claim 2, wherein said pressurized fluid in the working chambers of said cylinder member is a liquid, said pressurized fluid in said cavity of said cylinder element is a gas, and said cylinder element is connected to said cylinder member such that said gas pressure acts upon the liquid within said working chambers of said cylinder member.

4. The construction of claim 3, wherein said remote end of said cylinder member and said remote end of said cylinder element are defined by a movable separating wall provided between said cavity of said cylinder element and the adjacent one of said working chambers within said cylinder member.

5. The construction of claim 2, wherein said cylinder member and said cylinder element are formed by an integral cylindrical tube member.

6. The construction of claim 1, wherein the fluid within said working chambers of said cylinder member and the fluid in the cavity are under substantial identical pressure, and the cross-sectional area of said piston rod element is smaller than the cross-sectional area of said piston rod member.

7. The construction of claim 1, wherein locking means are provided for locking said piston rod element in at least one axial position with respect to said cylinder element.

8. The construction of claim 7, wherein said one axial position is adjacent the outermost position of said piston rod element with respect to said cylinder element.

9. The construction of claim 7, wherein said gas spring device further includes a piston carried by said piston rod element within the cavity of said cylinder element, said piston defining two working compartments within said cylinder element cavity, first passage means across said piston for connecting said working compartments, said first passage means being closed only when said piston rod element approaches said one axial position, second passage means across said piston for connecting said working compartments, said second passage means including valve means responsive to the direction of movement of said piston rod element with respect to said cylinder element so as to open only in response to outward movement of said piston rod element relative to said cylinder element, and third passage means across said piston for connecting said working compartments, said third passage means including check valve means which open only when the pressure in the working compartment remote from said apertured end of said cylinder element exceeds the pressure in the working compartment adjacent said apertured end of said cylinder element by a predetermined pressure difference.

10. The construction of claim 7, wherein said locking means are mechanical locking means, operable by axial movement of said piston rod element with respect to said cylinder element.

* * * * *